United States Patent Office 2,915,283
Patented Dec. 1, 1959

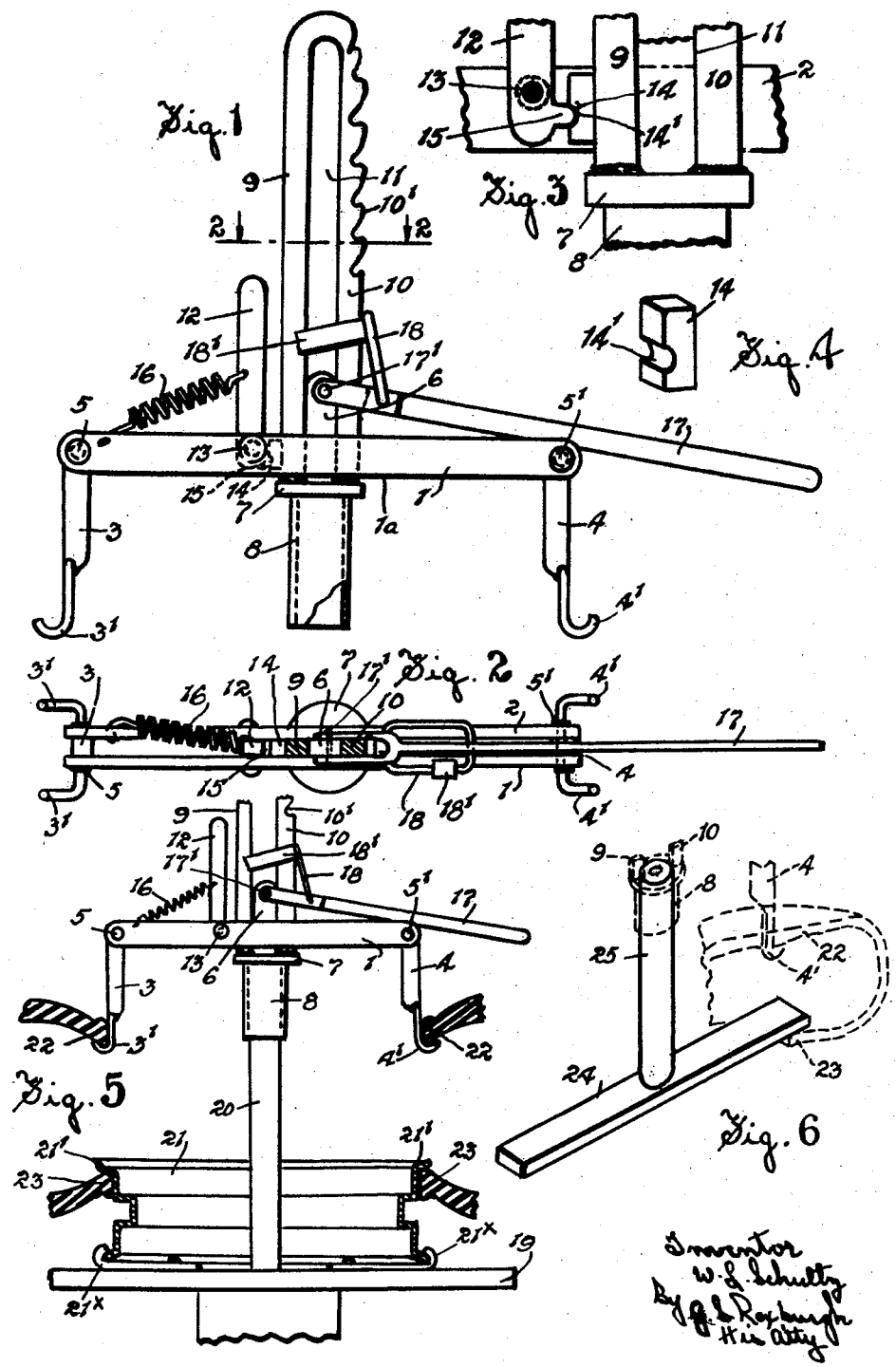

2,915,283

TIRE SPREADING TOOLS

William L. Schultz, Red Lake Falls, Minn., assignor, by mesne assignments, to Steelman Products Corporation, Red Lake Falls, Minn., a corporation of Minnesota Application June 17, 1954, Serial No. 437,433

5 Claims. (Cl. 254—50.4)

The invention relates to a tool for spreading motor vehicle and such like tires to permit of the convenient and easy inspection of the interior wall of the tire and an object of the invention is to provide a tool by the use of which, upon one bead of a tire being anchored and the other free, the free bead can be easily and quickly moved away from the anchored bead to spread the tire a greater or lesser degree for easy and quick inspection of its inner wall.

A further object is to provide a tool for the above purpose which can be manufactured from stock material at relatively low cost, easily and quickly set to work and operated and is comparatively light and sturdy.

A further and more detailed object is to provide a tool embodying a tire spanning cross head provided at its ends with bead gripping hooks and centrally of its length with an upstanding guide bar, a plate having a downwardly extending sleeve located centrally underneath the head and provided with a pair of upstanding legs forming a guideway for the guide bar, one of said legs being provided with ratchet teeth, a hand lever pivotally secured to the guide bar and supplied with a weighted link engageable with the ratchet teeth and means for automatically locking the head in any raised position.

A further object is to provide pivoted hooks carried by the head which permits them to swing in or out to engage and hold beads of varying diameter.

With the above more important objects in view, the invention consists essentially in the arrangement and construction of parts hereinafter described, reference being had to the accompanying drawing in which:

Fig. 1 is a side view of the tool.

Fig. 2 is a cross sectional view at 2—2 of Fig. 1 and looking downwardly, the link being turned outwardly and downwardly to expose construction.

Fig. 3 is an enlarged detailed side view of the lower end of the locking lever and other associated parts.

Fig. 4 is a perspective view of the friction block.

Fig. 5 is a side view of the greater part of the tool, and in reduced scale, and showing how it is used to spread a tire.

Fig. 6 is a perspective view of a tire bead anchoring attachment for the tool and showing in dotted lines fragmental portions of the spreading tool and of a tire, to show the manner of use of the attachment.

In the drawing like characters of reference indicate corresponding parts in the several figures.

In constructing the tool, I provide a cross head 1a comprised of a pair of stout, spaced side bars of equal length, indicated at 1 and 2, between the opposite ends of which I place the upper ends of similar lifting bars 3 and 4 each supplied at its lower end with a pair of spaced bead grasping hooks or members 3' and 4'. The upper ends of the bars 3 and 4 are pivotally secured to the bars 1 and 2 by bolts 5 and 5'.

Between the bars 1 and 2 I locate an upstanding central guide bar 6 which has its lower end permanently secured to the bars 1 and 2 as by welding and these several bars form a cross head which can be lowered or raised as later apparent.

Bars 1 and 2 are vertically shiftably mounted on a frame which includes a cross or base plate 7, sleeve 8 and upstanding legs 9 and 10. The downwardly extending sleeve 8 is permanently attached as by welding cross plate 7. The pair of spaced, upstanding legs 9 and 10 of predetermined length are fixed as by welding to cross plate 7 and such legs provide a central, vertical guideway 11 for the guide bar 6. The legs 9 and 10 have their upper ends interconnected and are actually made from a single length of bar metal bent into an elongated U-shape and having its ends secured to the plate. The leg 10 is supplied with a plurality of ratchet teeth 10'. The plate 7 forms a seat for the legs.

Means is provided for automatically, releasably locking the head to the legs and such embodies an upstanding locking lever 12 having its lower end entered between the bars 1 and 2 and pivotally secured thereto by a cross bolt 13. This bolt is positioned so that the lower end of the lever is spaced from the leg 9 to admit a locking friction block 14 engaging the adjacent side of the latter leg and the block is supplied with a semi-circular notch or cross slot 14' which receives a relatively short, fixed finger 15 extending from the side of the lever. It will be observed that the finger is somewhat below the horizontal axis of the bolt 13. A coiled tension spring 16 connects the lever with the outer end of the bar 2 and the arrangement is such that the finger normally presses the block against the leg 9 under the influence of the spring.

In order to raise the head in relation to the legs, I have supplied a hand lever 17 which has its inner end forked to span the leg 10 and the bar 6 and the forks are pivotally secured to the guide bar by a bolt 17'. The forks carry pivotally, an open centered link 18 which is circular in cross section, and the link has an extending weight 18' secured thereto at its upper end which acts to maintain the link normally riding the outer edge of the leg 10. It will be obvious that if the outer end of the lever 17 be raised, the link will travel up and become engaged with the first or lowermost tooth and that in subsequent up and down movement of the lever, the head will rise one tooth displacement. It will also be noted that when the link is released from a tooth, the head remains in its raised position due to the pressure of the locking block 14 on the leg 9.

This device can be used in a variety of ways.

If a deflated tire is on a wheel rim and has one bead cleared from the rim flange and the device is to be operated over a work table having a central post and means for anchoring the rim to the table, the work can be done as shown in Fig. 5 where the table 19 has the fixed, upstanding, central post 20 and the standard type wheel rim 21 is anchored to the table by suitable clamps $21^x$ and the one bead 22 of the tire is free of the upper flange 21'', and the other bead 23 is retained between the flanges of the rim.

With such a set up, the tube 8 is telescoped over the upper end of the post 20 with the upper end of such post engaging the crossing plate. The head is brought to its lowermost position and the then free bead of the tire is lifted and caught on the hooks. One then actuates the hand lever 17 and such causes the upper bead to be moved away from the lower bead and the tire to become spread for ready and clear inspection of the inner wall thereof. It will be noted that when the upper bead is first raised by hand to become engaged by the hooks, that the lower bead will also be raised to become engaged and stopped by the upper flange 21'.

After the required inspection has been completed the cross head is dropped to its original position by lifting the outer end of the handle or lever 17 to clear the link from the engaged tooth and pressing the lever 12 towards the leg 9 to release finger pressure against the block 14.

If the spreading of the tire is to be done without clamping the rim against raising, as shown in Fig. 5 one can utilize a stout spanner bar 24 as shown in Fig. 6, the bar being supplied centrally of its length with an upstanding fixed post 25. By using such a bar one can spread the tire on the rim or off the rim. If the tire is on the rim such as shown in Fig. 5, one inserts the bar 24 centrally across the upper flange of the rim and then places the tool on the upper end of the post and proceeds to work in the same manner as described when mounted on the post 20. On the other hand if the tire is completely free of the rim, one inserts a bar and post, such as shown in Fig. 6, with the bar passing centrally across the lower bead 23 of the tire to hold the tire down when the tool is placed on the upper end of the post and operated with its hooks engaged with the upper tire bead 22.

What I claim as my invention is:

1. In a tire spreading tool, in combination, an upstanding member presenting a pair of spaced legs providing a vertical guideway therebetween, a base plate forming a seat secured to the lower ends of the legs, one of said legs being provided with a series of ratchet teeth defining a plurality of upwardly facing engaging surfaces, a cross head spanning the legs and provided with a centrally located guide bar fixed thereto and slidably received within the guideway, tire bead grasping hooks secured to the ends of the cross head, a hand lever pivotally secured to the guide bar, a generally upright link pivotally carried at its lower end by the lever and leaning against the last mentioned toothed leg, said link being engageable with said surfaces of the ratchet teeth to facilitate raising of the cross head and hooks for spreading the beads of a tire, and releasable friction means for holding the cross head against dropping upon the release of the link from any ratchet tooth.

2. The device as claimed in claim 1 wherein the link is weighted to normally remain engaged with the toothed leg.

3. A tire bead spreading device for use with means anchoring the lower bead of a tire and providing an upstanding fixed post passing centrally through the tire, a base plate seatable on the upper end of the post and provided with a depending sleeve telescopically mountable on the post and with an upstanding guide bar at the face remote from the sleeve, and a cross head guided in movement by the guide bar and limited in downward movement by said plate and provided at its ends with means for grasping the upper free bead of the tire and with means for gradually raising the cross head to spread the tire.

4. A device for spreading the opposed side walls and beads of a tire from each other and comprising an attachment for use with a wheel supporting table for securing one of the tire beads thereto and having an upstanding post connected thereto, said device comprising a frame including a depending sleeve mountable on such a post, a cross head shiftably mounted on said frame and having depending bead-gripping members secured thereto in spaced relation with each other, means connected with said cross head and with said frame for shifting said cross head upwardly away from the table and thereby spreading the side walls of a tire to which said bead-gripping members are secured.

5. In a tire spreading tool, in combination, an upstanding member presenting a pair of spaced legs providing a vertical guideway therebetween, a base plate forming a seat secured to the lower ends of the legs, one of said legs provided with a series of ratchet teeth, a cross head spanning the legs and provided with a centrally located guide bar fixed thereto and slidably received within the guideway, tire bead grasping hooks secured to the ends of the cross head, a hand lever pivotally secured to the guide bar, a link pivotally carried by the lever and engageable with the ratchet teeth, a spring-pressed lever pivotally mounted on the cross head adjacent the outer edge of the non-toothed leg, said lever being provided at its lower end with a finger extending toward the leg and a friction block interposed between the lever and said last mentioned leg and provided with a cross slot to receive the finger.

References Cited in the file of this patent

UNITED STATES PATENTS

| | | |
|---|---|---|
| 848,524 | Yeager | Mar. 26, 1907 |
| 851,313 | Pearson | Apr. 23, 1907 |
| 1,410,569 | Hilton | Mar. 28, 1922 |
| 1,760,719 | Rekenthaler | May 27, 1930 |
| 2,028,440 | Dalrymple | Jan. 21, 1936 |
| 2,323,144 | Long | June 29, 1943 |
| 2,430,996 | Rush | Nov. 18, 1947 |